US007228192B2

(12) United States Patent
Popplewell

(10) Patent No.: US 7,228,192 B2
(45) Date of Patent: Jun. 5, 2007

(54) METHOD FOR MANUFACTURING AN ITEM

(75) Inventor: Hal Popplewell, Northville, MI (US)

(73) Assignee: Agentware Systems, Inc., Northville, MI (US)

( * ) Notice: Subject to any disclaimer, the term of this patent is extended or adjusted under 35 U.S.C. 154(b) by 0 days.

(21) Appl. No.: 10/750,741

(22) Filed: Jan. 2, 2004

(65) Prior Publication Data
US 2005/0149216 A1 Jul. 7, 2005

(51) Int. Cl.
*B23Q 17/00* (2006.01)
*G06F 19/00* (2006.01)

(52) U.S. Cl. ............... 700/115; 700/106; 700/99; 700/107; 700/112; 700/116; 29/430; 29/720

(58) Field of Classification Search ............ 700/99, 700/106, 107, 112, 116; 29/430, 720
See application file for complete search history.

(56) References Cited

U.S. PATENT DOCUMENTS

| 3,076,257 | A | * | 2/1963 | Svenson ............... 29/888.025 |
| 4,069,764 | A | * | 1/1978 | Teyssedre ............... 104/172.5 |
| 4,611,380 | A | * | 9/1986 | Abe et al. ............... 29/430 |
| 4,715,772 | A | * | 12/1987 | Kanayama ............... 414/730 |
| 4,783,904 | A | * | 11/1988 | Kimura ............... 29/786 |
| 4,937,929 | A | * | 7/1990 | Nokajima et al. ............ 29/430 |
| 5,207,309 | A | * | 5/1993 | Simpkin et al. ....... 198/341.09 |
| 5,893,208 | A | * | 4/1999 | Sasaki ............... 29/711 |
| 6,226,848 | B1 | * | 5/2001 | Kurtz ............... 29/407.01 |
| 6,234,749 | B1 | * | 5/2001 | Hasegawa et al. ....... 415/173.4 |
| 6,404,339 | B1 | * | 6/2002 | Eberhardt ............... 340/572.1 |
| 2003/0196312 | A1 | * | 10/2003 | Moore et al. ............... 29/430 |

OTHER PUBLICATIONS

Specification of U.S. Appl. No. 09/544,422, now abandoned.*

* cited by examiner

*Primary Examiner*—Michael D. Masinick
(74) *Attorney, Agent, or Firm*—Blaney Harper; Jones Day

(57) ABSTRACT

According to a first aspect of the present invention, a method is provided for manufacturing an item. The method comprises the steps of creating a build schedule; creating a first portion of the item for manufacture; causing the first portion of the item to pass in close proximity to a first individual; which said individual assembles at least one of the several components on the first portion; notifying a second individual of the existence and location of the first portion of the item proximate to the first individual; causing the first portion of the item to pass in close proximity to the second individual whereby said second individual assembles at least one of the several components onto the first portion of the item. The method further includes applying dataforms or other such markings on individual components to uniquely identify them and, through such markings, tracking the application of those components to the item being manufactured at each manufacture step. Moreover, the information associated with the components as they are tracked through the manufacture process is used to maintain and enhance the efficient operation of the assembly line. These and other aspects, features, and advantages of the present invention will become apparent from a reading of the following detailed description of the preferred embodiment of the invention and by reference to the following drawings.

16 Claims, 6 Drawing Sheets

METHOD FOR MANUFACTURING AN ITEM

FIELD OF THE INVENTION

The present invention generally relates to a method for manufacturing or assembling an item and more particularly to a method for manufacturing or assembling an item, such as a vehicle, which requires the assembly of a relatively large number of components.

BACKGROUND OF THE INVENTION

Items, such as vehicles, are typically manufactured or assembled by the use of a relatively large number and variety of components such as, for example, engines, wheels, wiring harnesses, sun roofs, and hoods. Oftentimes, an "assembly line" is used to manufacture such vehicles or other items. An assembly line is a well known arrangement whereby, for example, various components of a vehicle are operatively placed upon the body or frame of the vehicle at various stations or locations of the assembly line. In this manner, each station or location corresponds to a unique stage of the overall vehicle assembly process and requires the placement of a unique component or the performance of a certain function upon the partially formed vehicle. A single assembly line may be used to produce a wide variety of different models or types of vehicles in order to efficiently utilize the manufacturing machinery and personnel included within and/or cooperatively forming the assembly line.

While the traditional assembly line process does allow efficient use of resources, modem manufacturing has evolved to reveal substantial limitations in this process. For example, many models being built on the same line require a number of unique types of components. The number of different types of vehicles which may be running on a single line is typically proportional to the number of different types of components which must be used during the manufacturing process. As a result, a great variety of components must be coordinated for use on multiple types of vehicles (or products) for a single assembly line. Coordinating the assembly of this wide array of components has led to a substantial decrease in line efficiency.

Further, since vehicles (or other products) are manufactured at a relatively fast pace, the large number of components discussed above must be readily available to the assembly line personnel. Normally, component storage space existing along the assembly line is minimized. Hence, many of these components must be selectively "shuttled" into the assembly area on an "as needed" basis. Such shuttling of parts further enhances the need for coordination of part delivery and use. In particular, it is desirable to have specific components available and delivered to the proper location before these components are actually needed or utilized in order to allow for a continuous manufacturing process and to maximize the number of vehicles (or other products) which are produced.

Moreover, the assembly line process is further complicated by the fact that a build schedule for any one or more of the models may be changed or updated frequently. A "build schedule" identifies the order that different types of vehicles (or products) are to be manufactured by the assembly line and identifies the components which are to be used in each of those types. The build schedule is typically created before assembly process actually begins, thereby allowing a planned or scheduled "shuttle" of components in the assembly area to occur. Frequently, the "build schedule" must be dynamically altered or changed due to difficulties or occurrences, which arise after the build schedule has been created. For example, faulty components may have been identified which prevent a certain type of vehicle to from being built in accordance with the build schedule. Also, changes in types of components or in the delivery schedules of the components may require modification of a build schedule. Whenever the component transport schedule is not modified to reflect these "build schedule changes," or is incorrectly modified, the assembly line process may be delayed causing substantial inefficiencies.

Accordingly, there is therefore a need for a new and improved method for manufacturing and/or assembling an item, such as a vehicle, which overcomes some or all of the previously delineated drawbacks of prior methods.

OBJECTS OF THE INVENTION

It is an object of the present invention to provide a method for manufacturing an item which enhances the efficiency of the manufacturing process.

It is another object of the present invention to provide a method for manufacturing an item which coordinates the delivery of components such that the efficiency of the manufacturing process is enhanced.

It is still another object of the present invention to identify information concerning each of the components used in manufacturing an item and coordinate that information so as to facilitate delivery of the components at such a time to enhance the efficiency of the manufacturing process.

It is still a further object of the present invention to transmit information concerning the delivery and use of components in a manufacturing process to a supplier of such components to facilitate delivery of the components to the manufacturing line at such at time to enhance the efficiency of the manufacturing process.

SUMMARY OF THE INVENTION

According to a first aspect of the present invention, a method is provided for manufacturing an item. The method comprises the steps of creating a build schedule; creating a first portion of the item for manufacture; causing the first portion of the item to pass in close proximity to a first individual; which said individual assembles at least one of the several components on the first portion; notifying a second individual of the existence and location of the first portion of the item proximate to the first individual; causing the first portion of the item to pass in close proximity to the second individual whereby said second individual assembles at least one of the several components onto the first portion of the item. The method further includes applying dataforms or other such markings on individual components to uniquely identify them and, through such markings, tracking the application of those components to the item being manufactured at each manufacture step. Moreover, the information associated with the components as they are tracked through the manufacture process is used to maintain and enhance the efficient operation of the assembly line. These and other aspects, features, and advantages of the present invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
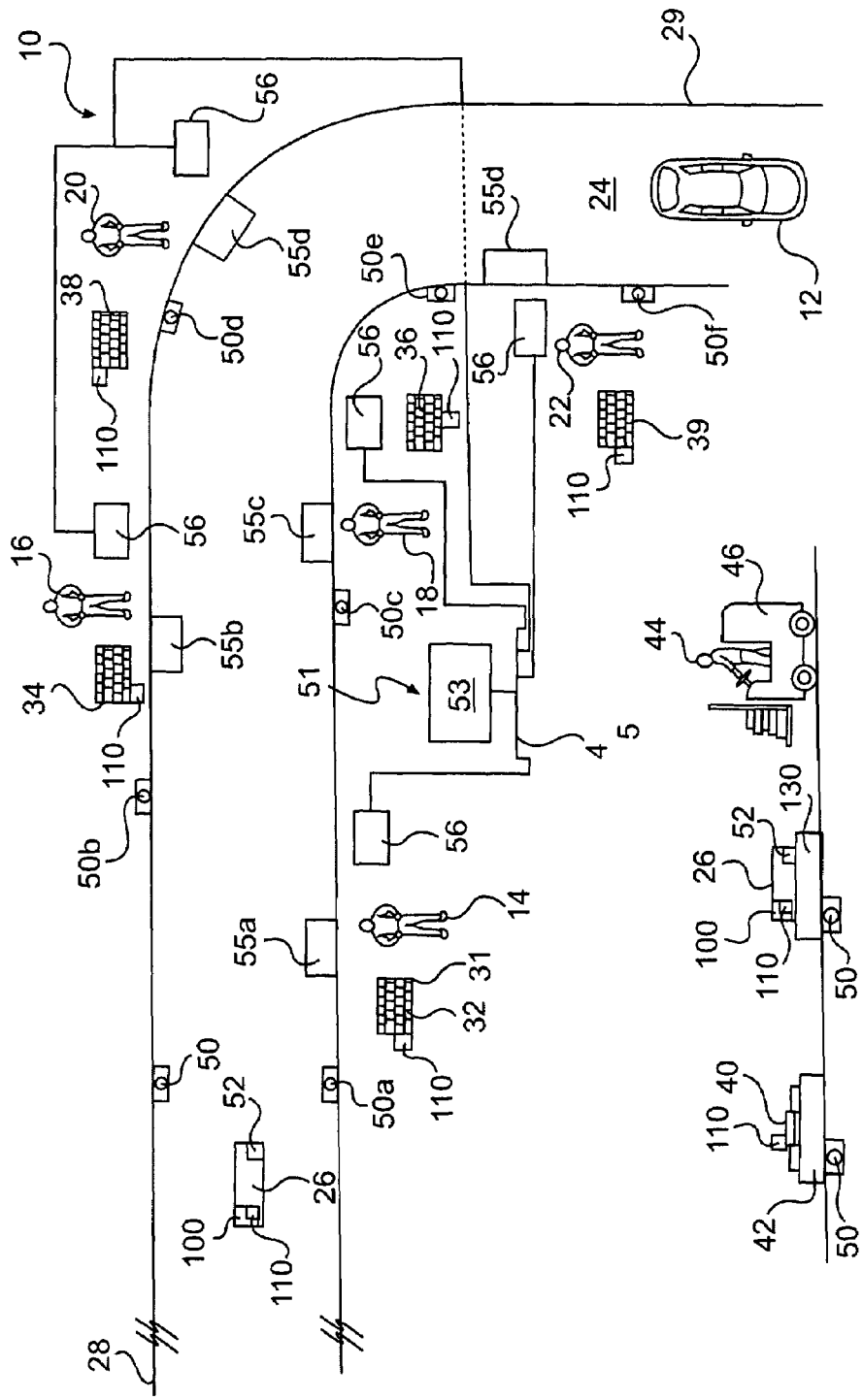
FIG. 1 is a block diagram depicting an assembly line to which the methodology of one embodiment of the invention may be selectively applied.

Referring now to FIG. 1, there is shown a vehicle manufacturing or assembly line 10 which is adapted to produce a vehicle 12. It should be appreciated that while assembly line 10 is, in this example, adapted to produce a vehicle 12, assembly line 10 could also be adapted to selectively produce other products and/or items (e.g., engines, transmissions, toasters, computers, etc.) which are susceptible of being manufactured on an assembly line basis and that the methodology of the present invention is not limited to the manufacture and/or assembly of a vehicle. Assembly line 10 includes several individuals or "operators" 14, 16, 18, 20, and 22 respectively who are uniquely positioned in close proximity to a transport assembly or member 24 (e.g., a conveyor belt or assembly line). A first portion 26 of a vehicle 12 (e.g., a previously formed body or frame assembly) is placed at the beginning or "entry point" 28 of the conveyor 24 and is sequentially and subsequently transported in close proximity to individuals 14, 16, 18, 20, and 22 who respectively place unique components onto the first portion 26, thereby cooperatively producing a vehicle 12. Once the vehicle 12 is assembled it exits the conveyor at the exit point 29. Several other substantially identical first portions 26 may also be sequentially placed upon transport member 24 and used to assemble or create a vehicle, such as vehicle 12, in the foregoing manner.

In FIG. 1, each first portion 26 may be used to form unique models or types of vehicles 12 which require unique types of components 100. Each first portion 26 and component 100 is marked with an unique information tag 52 and 110 respectively. The tag is a dataform or data matrix such as a machine readable one or two dimensional bar code symbol containing data or a tag which emits a signal (such as a radio frequency or optical signal) containing data. The tag may be pin stamped, edged into the component 26 and 100, glued, magnetically attached or otherwise coupled to the part in any conventional manner. The data matrix symbol is more reliably and efficiently read by machine but it is also useful to have in addition human readable text whenever an operator 14, 16, 18, 20, and 22 uses a part. Information may be selectively placed upon the tag, which among other things should preferably consist of an unique designation for each component 26 and 100 including for example, a serial number, a date stamp that has either a year, month, day or Julian date when the part is stamped, a sequence or batch number, supplier identification, and a checksum for accuracy.

Components 100 may be placed on first portions 26 by the individual operators 14, 16, 18, 20, and 22. Hence, each individual operator 14, 16, 18, 20, and 22, during the vehicular assembly process may be respectively required to place many different types of components 100 on the various received first portions 26. As shown in FIG. 1, the components 100 that that will be placed on the first portion 26 during the vehicular assembly process, such as specific components 32, 34, 36, 38, and 39 may respectively reside in close proximity to assemblers or installers 14–22 or, such as components 40, may be stored at area or location 42 which is remotely located from conveyor 24 and from assembly line 10. These remotely located components 40 may be selectively transported to the individuals 14–22 by an individual 44 operating a "lift truck" 46. Alternatively, these components may be transported to these individuals 14–22 by use of a handcart or some other manual or selectively driven transport assembly or vehicle.

In one non-limiting embodiment of the invention, a computer system 53 interacts with line sensors 50(a)–(e) and machine tools 58(a)–(e) and/or individuals 14, 16, 18, 22 and 22 to enhance the efficiency of the manufacturing process. In particular, computer system 53 operates to receive information from line sensors 50(a)–(e) concerning the line location of any one vehicle (or product) and from machine tools 58(a)–(e) or individuals concerning components (32, 34, 36, 38 and 39) to be added to the vehicle. The line sensors, machine tools, or other appropriate apparatus reads information from the tags placed on first portions 26 and the components 100, 32, 34, 36, 38 and 39. The computer system also operates to compile the received information and display the status of the manufacturing line on display systems 56 as well as to identify vehicles which fail to conform to the build schedule status and to notify either a supplier or individuals working on the line or others that the supply of components is insufficient or fails to otherwise conform to the build schedule.

Sensors 50, such as a radio frequency receiver, are placed at different locations along the assembly line 10. The sensor 50 should preferably be capable of reading data from a component or part via optical or laser scanning, magnetic sensing, radio or other information transmission technique including sensing 2D alphanumeric (OCR), Dot Matrix, and/or 2D barcodes. It is also desirable that the sensor encompass the ability to accomplish simple error proofing such as the presence absence detection and positional measurements. The sensor 50 must also be capable of communicating with the computer system 53, preferably through a radio frequency link in which the sensors send and receive data according to a standard protocol such as IEEE 802.11 (b). It is preferable that sensors 50 be placed proximate to an unique one of the individuals 14–22. Each sensor 50 senses the identity of the first portion 26 which is currently located proximate to it. For example, by the use of a radio frequency tag 52 on each first portion 26, the sensor detects "identifying information" from the first portion which includes the model of vehicle of which this first portion 26 is a part and other information such as supplier identification, batch number, etc. A sensor 50 is also placed at entry portion 28 and exit portion 29 in order to identify the time and the existence of each first portion 26 as it enters and exits the assembly line 10.

In operation for example, as shown in FIG. 1, where first portion 26 reaches sensor 50(a), sensor 50(a) detects the information encoded in tag 52 which identifies model information of first portion 26. Sensor 50(a) relays this information and location of sensor 50(a) in the manufacturing line, to computer system 53. Based on this information, computer system 53 updates its production status database which tracks the manufacturing status of the first portion 26 as it moves through the manufacturing line 24, and transmits over bus lines 54 a visual depiction of that status to display devices 56. Display devices 56 are interactive display devices which may incorporate touch panels or the like which are located adjacent manufacturing stations along the production line. The display devices 56 display graphical depictions of the line status on a real time basis. Through the interactive mechanism of the display device 56 (e.g., touch panel), an individual operator can update information in the system and receive information concerning future production requirements of that individual operator station.

Once the first portion 26 has passed sensor 50(*a*), individual operator 14 assembles component 32 onto first portion 26 in conjunction with machine tool 55(*a*). The identity of component 32 is shown on display 56 because computer system 53 has identified the appropriate build schedule associated with the first portion 26 at sensor location 50(*a*). Identifying component 32 on the display 56 at the location of sensor 50(*a*) permits the operator 14 to verify before assembly that the right component is being used for the particular first portion 26 at location 50(*a*). Component 32 is selected from a plurality of such components 31. The individual operator employs a hand held scanner or the like which is used to optically scan a tag 110, such as a dataform (one or two dimensional bar code or the like) symbol attached to or formed on or in the component. The data read from the component is transmitted from the hand held device to the computer system 53 using a radio frequency data link similar to that employed by sensors 50. After component verification and scanning, the individual operator 14 then installs the component 32 into the first portion 26 using a machine tool 55(*a*) such as a robotic arm or other similarly computer or programmable logic controlled apparatus. The machine tool 55(*a*) relays information (again, using a radio frequency data link) concerning the installation of component 32 (such as the serial number identity of component installed, time of installation, automatic measurements, status checks, warning flags, etc.) to computer system 53. From the information generated by the operator 14 scanning the component 32 and the information from machine tool 55(*a*), the computer system 53 updates its production status database to indicate that component 32 has been assembled onto first portion 26 at the line location of machine tool 55(*a*). Other information in the production status database concerning the product being manufactured, for example testing results, operator identity, tolerances, the component supply status (e.g., quantity remaining) or other data may also be updated at this time as well. That updated information is then graphically depicted by computer system 52 on display devices 56.

In the foregoing explanation, the data concerning the component 32 or first portion 26 may also be entered through manual keystroke operations or touch screen entries. As this type of operation is more prone to entry error it is not a preferred embodiment but may be used in many situations in which automatic data entry is impracticable, too expensive or otherwise undesirable. Similarly, since many assembly operations do not involve machine tools, data concerning the installation of any component may be entered by a non-automatic mechanism. Notwithstanding the foregoing, many assembly line production techniques make use of programmable logic controllers (PLCs) or computers to control the movement through the manufacturing line of the product being manufactured or to control individual operation of tools or robots performing operations on the production line. The data generated or used by such PLCs or computers in these control operations, are thus, also sent to computer system 53 through dedicated bus lines or radio frequency data or similar apparatus to be processed and otherwise coordinated in the production status database to be displayed on display systems 56 and otherwise control the movement and availability of resources (such as components or maintenance services) that maximize the efficiency of the production line.

After the first portion 26 has passed machine tool 55(*a*) and the production status database has been updated, the first portion passes by sensor 50(*b*) and the cycle of data gathering and status updates begins again. Specifically, individual operator 16 verifies that component 34 having tag 110 is the next component for assembly, scans component 34, and then uses machine tool 55(*b*) to assemble component 34 onto first position 26. Data from the component scanning and machine tool operations is then transmitted to computer system 53 which updates its production status database and graphically depicts that updated status on display devices 56. This data generation and status update process continues for each remaining sensor 50(*c*)–(*e*) and associated components 36, 38, and 39 and machine tools 55(*c*)–(*e*). After the final assembly process has been completed, the product passes the final sensor 50(*f*) and a final status update showing a completed build schedule is generated.

Because data concerning the addition of components to a product under assembly is generated during each assembly step, and the production status database and display is updated in real-time when data is received from each of such assembly steps. As a result, the nature of the build process can be dynamically changed and the movement of resources to maintain efficient line operation can be dynamically modified. For example, during the production of a vehicle that has passed machine tools 55(*a*) and 55(*b*), the build schedule for this vehicle may be dynamically changed to call for component 36' (rather than 36) to be installed at machine tool 55(*c*). The operator can be notified of this change and use component 36' which can be checked when the tag 110 of the component is scanned or the machine tool installs the component. Avoiding the installation of an improper component is an important factor in increasing production line efficiency. Additionally, because component data such as quantity used, shipped, repaired and/or stored at the line is tracked by the computer system 53, shortages or overcapacity of a specific component may be identified prior to the shortage causing a disruption in the operation of the line. As a result, component resources may be moved to remedy a shortage or correct overcapacity in any particular component. In particular, production supply limits may be set in the production status database to indicate the proper supply of components. When the updated data in the production status database concerning component supply indicates either greater or smaller supply than these limits, automatic messages can be sent by computer or voice message over telephone or other means to personnel inside the plant or suppliers outside the plant to restock the components. Managing the component supply to keep the production line operational while minimizing storage of unused parts is another key factor in enhancing assembly line efficiency.

Moreover, because data from each step of the manufacturing process is retained in a database, that data can be used to generate metrics that characterize the operation of the line. In particular, because the time for starting and/or finishing each step is recorded, efficiency statistics such as jobs per hour, time per operation, and number of operations per assembly station can be monitored and analyzed for efficiency issues. Also, data concerning tests performed while manufacturing is ongoing such as component tolerances, electrical continuity, pressure seal or the like are integrated into the database and permit monitoring of the quality (including failure) through the line. Further, in managing the component supply and line operation, it must be recognized that access to the information in the production status database is not limited to display devices 56 on the production line. Rather, the information is accessible to line support staff (such as life operators 44 who move components to the production line) and external suppliers who provide components used in product assembly. Indeed, maximum efficiency in operating the assembly process requires that such personnel are automatically updated on a real time basis with the same production information as available on display devices 56.

Figure 2:
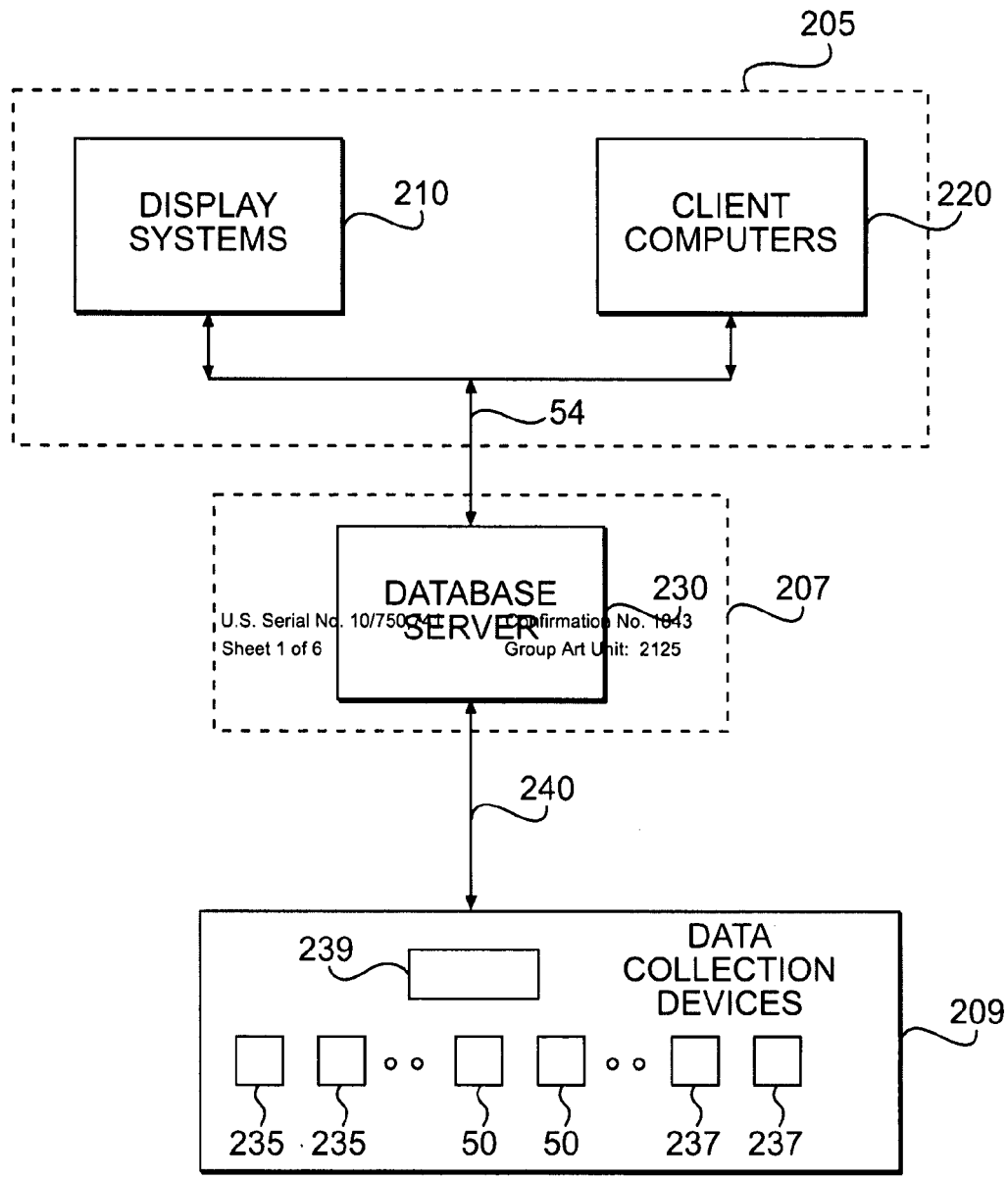
FIG. 2 is a block diagram of a computer system according to one embodiment of the present invention.

For the preferred embodiment of the present invention, the computer system 53 is a three tier client server system schematically depicted in FIG. 2. The bottom tier 209 comprises an interconnection of various data collectors that operate as an interface between the physical manufacturing environment and the database system tier 207. Tier 209 may include one or more PLCs 235, Sensors 50, hand held scanning devices 237 or other data entry devices such as PLCs or line control computers. In this embodiment, the data collection devices transmit and receive data from and to a base station 239 using radio frequency communication techniques conforming to the IEEE 802.11(b) standard. The base stations then transmits data to the database tier 207 through a TCP/IP based Ethernet network 240.

The database system tier 207 comprises database servers that archive data collected from the bottom tier 209 devices. The database servers incorporate software which verifies and updates the collected data. That is, where data indicates a conflict (e.g., component 36" is entered where component 36 is required), the software implements rules to identify the correct entry or notify the users of the conflict. The database software also includes programs for organizing and presenting the collected data such that, for example, proper build schedules are associated with the proper first portions 26 and components for identified first portions are properly coordinated with the build schedules. Additionally, the database software generates performance metrics from the received data. Such metrics include jobs per hour, error rates, time per station, etc. In the preferred embodiment, the software coordinates the collected data through a series of tables that are maintained in an Excel type spreadsheet. The tables identify various components and build schedules and data collected,from the bottom tier devices 209 is entered into these tables. The database server 230 in the preferred embodiment is a commercially available IBM RS/6000 running the AIX operating system and the MySQL database engine.

The database server 230 is coupled to the top tier 205 by bus 54. The top tier comprises one or more client computers 220 and/or a plurality 210 of dedicated display systems 56. The clients 220 and display systems 56 are conventional computers that run Java applets for receiving data from the database server (as well as other optional data requested by the user) and creating a graphical display of such data. The Java applets in the preferred embodiments run on Unix Linux and Windows systems.

Figure 3:
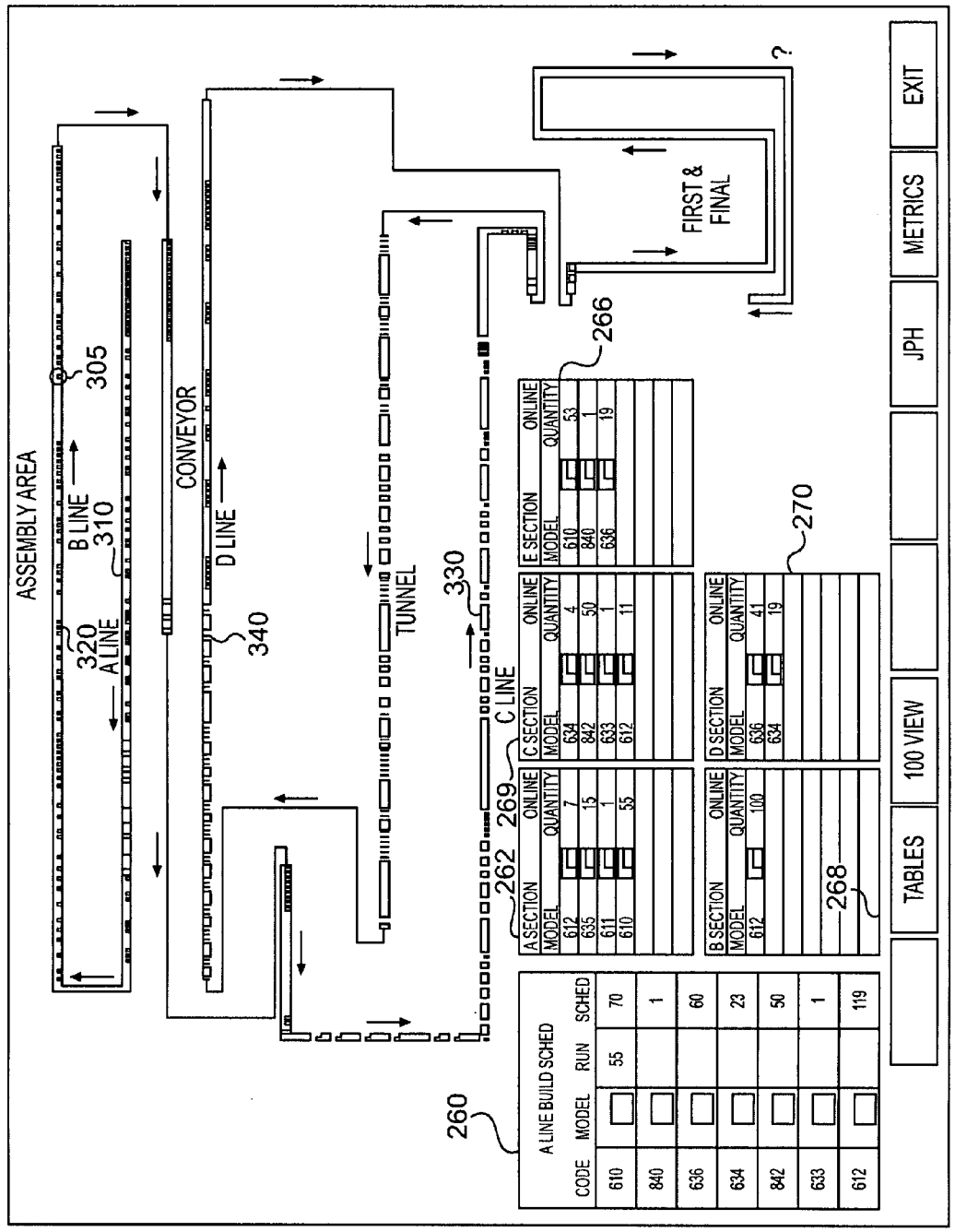
FIG. 3 is an example of a graphical display shown by a display system according to one embodiment of the present invention.

FIG. 3 is an example of a graphical display created for the display systems in the top tier 205 of the computer system. For this display, a wide area view shows the progress of assembly for lines A–D, (310, 320, 330 and 340 respectively). The display depicts the build schedule 260 illustrating the projected build quantities of seven (7) model types on line 310. The display also depicts an overview of the current status of products in each of the production lines (262, 264, 266, 268 and 270 respectively). As shown in FIG. 3, an icon (such as that indicated at 305) is uniquely assigned to each first item 26 which is positioned upon conveyor 24 for each line and each uniquely assigned icon is displayed upon each display device 56. The location of an icon upon each of the display devices 56 corresponds to the location, upon conveyor or transport assembly 24 of the product portion 26 to which that icon is respectively and uniquely assigned. That is, as a product portion 26 enters, proceeds through and exits an assembly line (310, 320, 330 or 340) its corresponding icon "moves along" or changes position upon each of the displays 56 in order to substantially ensure that an icon on a display 56 resides at a position, within the displayed graphical representation of the assembly line, which corresponds to its current position within the actual assembly line (310, 320, 330 or 340).

Figure 4:
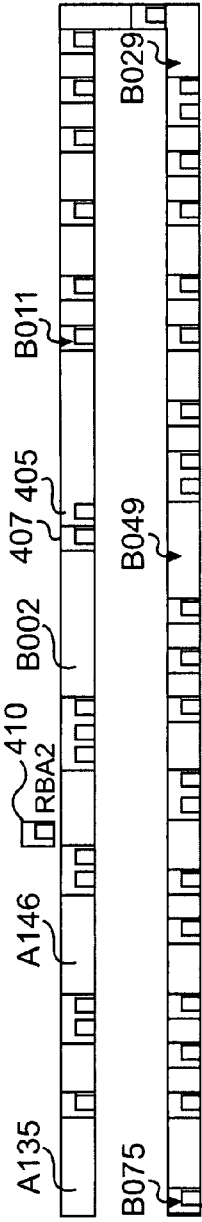
FIG. 4 is an example of a graphical display shown by a display system according to one embodiment of the present invention.

The icon displayed on display device 56 also provides access to data corresponding to the first portion 26 to which the icon is uniquely assigned. By selecting or clicking on any individual icon, information concerning the specific first portion 26 may be recalled such as the identity of components already installed, identity of components to be installed, time in production, quality measurements of installed components, or other metrics. In addition, selected portions of a line may be displayed for individuals along the line. FIG. 4 illustrates a display presented to an operator that indicates the production predicted to arrive at that operators location within a defined period of time, e.g., 30 minutes. In this screen, the operator is presented with a model changeover indicated by the fact that the icon 405 has a different appearance than that of icon 407. By icon 410, the operator also sees that one or more products are in the repair bay. Since a repair bay can contain multiple parts, selecting icon 410 will popup a display of which products are in the repair bay and the required components. Again, this information enhances the ability of the operator to manage component supply and line efficiency.

By referring to the graphical representation of the line such as that shown in FIG. 3, each individual 14–22 is apprised of the identity of each of the first portions 26 and/or components 100 which reside upon the transport assembly 24 and which are to be transported to the individuals 14–22. Such information allows any individual to order, by telephone, or by use of radio pagers or by other communication devices, individual 44 to bring needed components 40 necessary to assemble the first portions 26. As noted above, the computer system 53 may also notify such individuals automatically. Such components 40 are then selectively transported to the individuals 14–22. Hence, actual assembly data or information is presented to these individual assemblers 14–22 to "warn" or inform them of the need for remotely located components 40 and allows the assembly process to occur without substantial component transportation disruption. Hence, by providing actual or "real time" warning information of the existence of a first portion 26 and/or component 100 upon conveyor 24, each individual 14–22 may ensure the availability of needed componentry 40. The use of such "real time" warning data therefore improves upon the use of such previously delineated "build schedules" which were often times changed/modified and were susceptible to the previously delineated difficulties.

Figure 5:
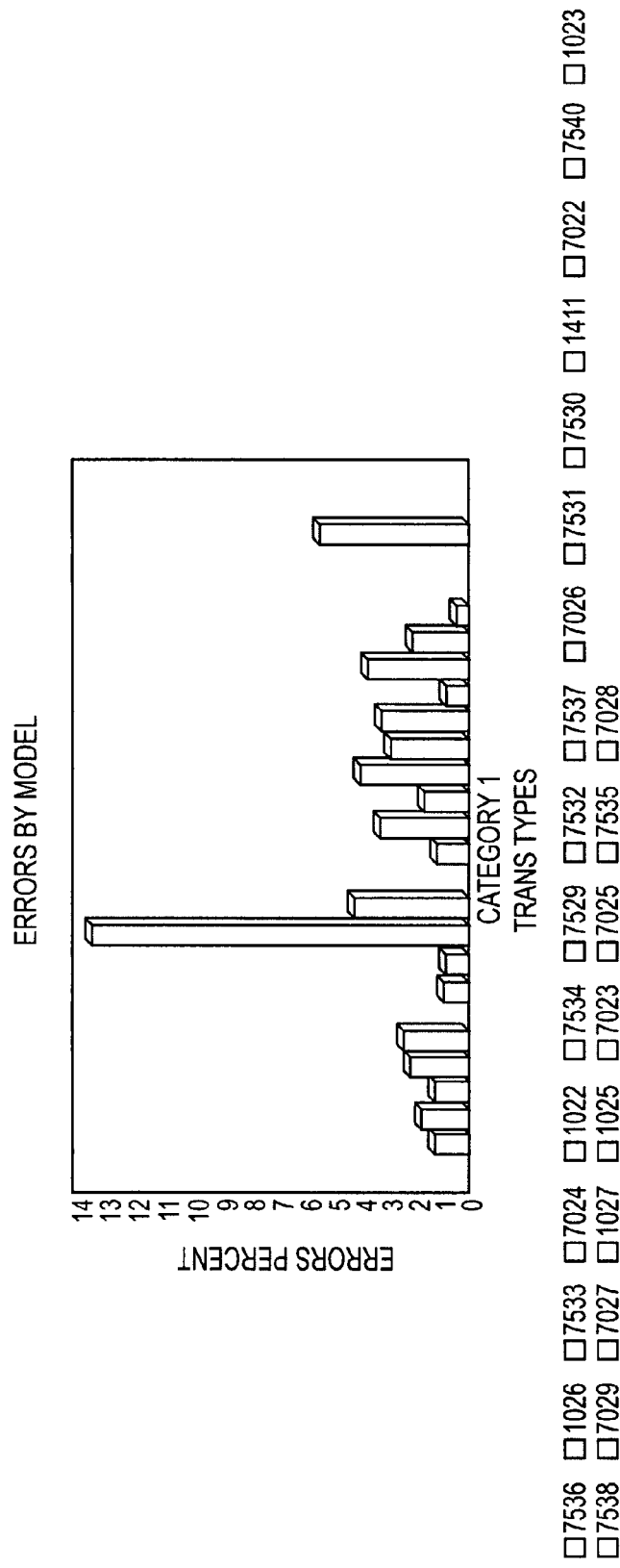
FIG. 5 is a graphical display of data stored by the computer system according to one embodiment of the present invention.

Additionally, specific process details such as measurement times or gage results (e.g., press forces of valve seats and frost plugs) and errors/disruptions that occur in the assembly line 10 may also be transmitted to the computer 53 because those events or measurements are recorded by PLCs that operate the physical movement of the line. As shown in FIG. 5 the computer system 53 compiles, for example, the error percentage of various different models by model type. In this example, one model type has a significantly higher error percentage than other model types. This information my be used to identify a source of manufacturing error, helping to enhance manufacturing efficiency, or it may indicate a design problem with the product itself.

Figure 6:
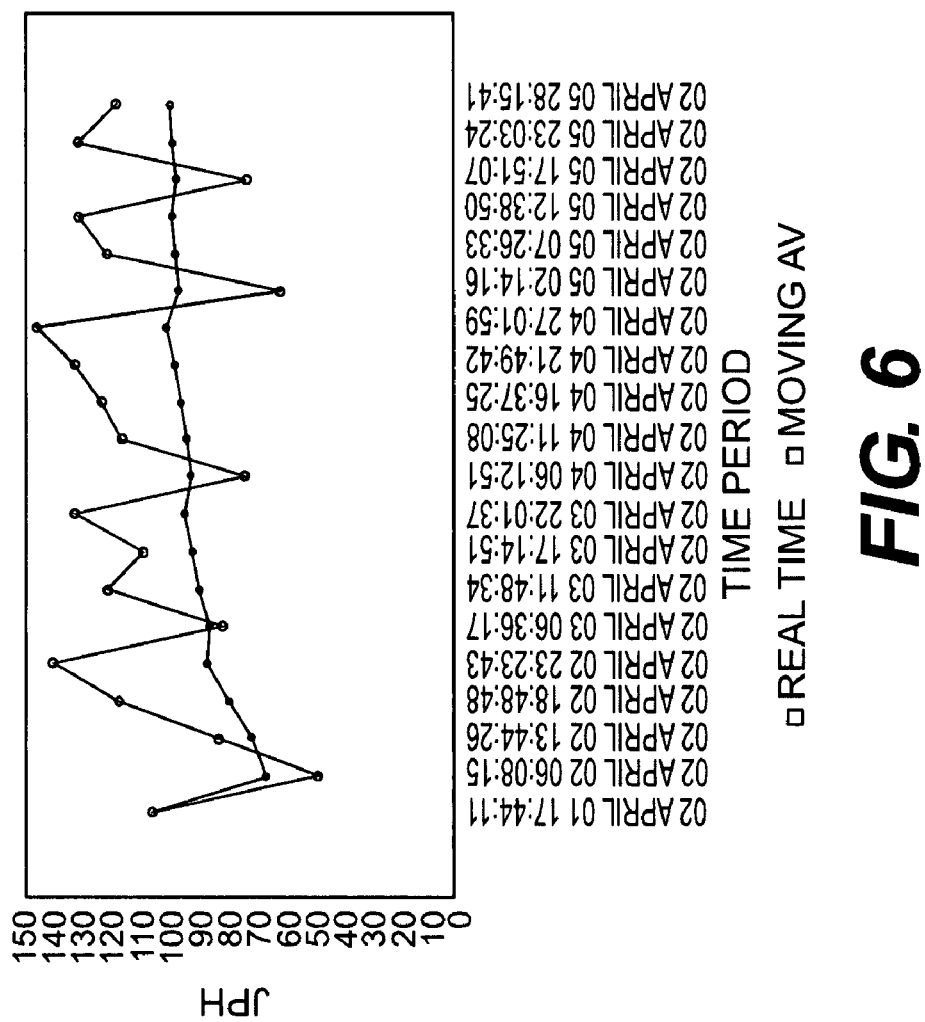
FIG. 6 a graphical display of data stored by the computer system according to one embodiment of the present invention.

All assembly data or information can be used for "real time" purposes and/or stored by the computer 53 for historical use. As shown in FIG. 6, the computer system 53 tracks the jobs per hour (JPH) for a manufacturing line by day and hour in real time and provide statistical feedback on such data such as a moving average. In one non-limiting embodiment, the "real time" and/or stored historical assembly information can be used to provide for quarantining purposes. When a defective first portion 26' or defective component 100' is found after the part exits the assembly line 10, a small number of first portions 26 or components 100 processed just before and just after the defective first portion 26' or defective component 100' can be quarantined instead of a full day's production.

In another non-limiting embodiment, the "real time" and/or stored historical assembly information can be used to provide reporting on the production. Reports may include lean manufacturing metrics or line side part use counting which can be sent via secure Internet connections to each supplier. Additionally, reports on information fusion to fill in missing or bad data may be used to provide proactive disruption condition detection, proactive recommendations for preventing such disruptions, production shift playback capability for product review, and material flow visualization display through the plant for an entire shift in a given time period, such as twenty (20) minutes or less. These reports can be used to identify what areas in the assembly line are causing disruptions or are slower than other areas This information then can be used to optimize the performance and efficiency of the assembly process.

It should be understood that the invention is not limited to the exact construction and method which has been previously delineated but that various changes and modifications may be made without departing from the spirit and the scope of the inventions as are more fully delineated in the following claims.

I claim:

1. A method of manufacturing an item using an assembly line having a plurality of operators wherein said item incorporates at least one component from each of a plurality of said operators, comprising:
    identifying to a computer system a first portion of said item by automatically reading a first information tag associated with said first portion;
    automatically determining the location of said first portion;
    recording said location of said first portion in said computer system;
    automatically identifying to said computer system at least one component to be added to said first portion;
    automatically reading a second information tag accompanying said component, said component and said first portion being separately tagged;
    transmitting information from said second tag to said computer;
    incorporating said component into said item;
    identifying to said computer system that said component has been incorporated into said item; and
    displaying information corresponding to said identification.

2. The method of claim 1 wherein said item comprises a portion of a vehicle.

3. The method of claim 1 further comprising the steps of:
    remotely locating components from said assembly line;
    automatically determining when said components are required by said manufacturing process; and
    automatically notifying a supplier that said components are required to be supplied to a manufacturing line.

4. The method of claim 1 wherein the step of displaying information corresponding to said identification comprises displaying said information on a graphical display accessible to an operator.

5. The method of claim 4, further comprising:
    creating a graphical representation of the status of an assembly line;
    displaying an icon on said graphical display representing the status of one first portion.

6. The method of claim 5 wherein said icon represents the location of said first portion on said manufacturing line.

7. A method of manufacturing an item using an assembly line, comprising:
    identifying to a computer system a first portion of said item by reading a first information tag accompanying said first portion;
    automatically determining the location of said first portion;
    recording said location of said first portion in said computer system;
    automatically identifying to said computer system at least one component to be added to said item;
    reading a second information tag accompanying said component;
    transmitting information from said second tag to said computer;
    incorporating said component into said item;
    identifying to said computer system that said component has been incorporated into said item; and
    updating a database to indicate a status of said item after said component has been incorporated into said item.

8. The method of claim 7 wherein said item comprises a portion of a vehicle.

9. The method of claim 7 further comprising the steps of:
    remotely locating components from said assembly line;
    automatically determining when said components are required by said manufacturing process; and
    automatically notifying a supplier that said components are required to be supplied to a manufacturing line.

10. The method of claim 9, further comprising:
    creating a graphical representation of the status of an assembly line; and
    displaying information on said graphical display representing the status of one first portion.

11. The method of claim 10 wherein said information comprises an icon representing the location of said first portion on said manufacturing line.

12. A computer-based system for controlling the manufacture of an item using an assembly line, comprising:
    a processing system; and
    memory coupled to the processing system,
    wherein the processing system is configured to:
        receive information comprising the identification of a first portion of said item from a tag reader adapted to read a first information tag accompanying said first portion;

automatically determining the location of said first portion;
record said location of said first portion;
automatically identify at least one component to be added to said item;
receive information regarding said component from a tag reader adapted to read a second information tag accompanying said component; and
update a database to indicate a status of said item after said component has been incorporated into said item.

13. The computer-based system of claim 12 wherein said item comprises a portion of a vehicle.

14. The computer-based system of claim 12, wherein the processing system is configured to:
remotely locate components from said assembly line;
automatically determine when said components are required by said manufacturing process; and
automatically notify a supplier that said components are required to be supplied to a manufacturing line.

15. The computer-based system of claim 14, wherein the processing system is configure to:
create a graphical representation of the status of an assembly line; and
display information on said graphical display representing the status of one first portion.

16. The computer-based sys of claim 15 wherein said information comprises an icon representing the location of said first portion on said manufacturing line.

* * * * *